(12) United States Patent
Hecker et al.

(10) Patent No.: US 9,340,187 B2
(45) Date of Patent: May 17, 2016

(54) METHOD FOR OPERATING A BRAKE DEVICE OF A VEHICLE WITH A BRAKE PRESSURE DIFFERENCE ON AN AXLE ADAPTED AS A FUNCTION OF A STEER INPUT

(75) Inventors: Falk Hecker, Markgroeningen (DE); Marco Schmidt, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 102 days.

(21) Appl. No.: 13/636,640

(22) PCT Filed: Mar. 23, 2011

(86) PCT No.: PCT/EP2011/054414
§ 371 (c)(1),
(2), (4) Date: Feb. 22, 2013

(87) PCT Pub. No.: WO2011/117279
PCT Pub. Date: Sep. 29, 2011

(65) Prior Publication Data
US 2013/0013152 A1    Jan. 10, 2013

(30) Foreign Application Priority Data
Mar. 24, 2010   (DE) .......................... 10 2010 012 497

(51) Int. Cl.
*B60T 8/1764* (2006.01)
*B60T 8/1755* (2006.01)
*B60T 8/50* (2006.01)

(52) U.S. Cl.
CPC ............ *B60T 8/1764* (2013.01); *B60T 8/1755* (2013.01); *B60T 8/505* (2013.01); *B60T 2220/03* (2013.01); *B60T 2260/024* (2013.01)

(58) Field of Classification Search
CPC .......... B60T 8/1764; B60T 2260/024; B60W 10/18; B60W 10/20; B60W 30/02
See application file for complete search history.

(56) References Cited

U.S. PATENT DOCUMENTS 6,450,592 B1 *  9/2002  Nishizaki et al. ............. 303/155
6,681,167 B2 *  1/2004  Bedner et al. .................. 701/48
(Continued)

FOREIGN PATENT DOCUMENTS

| CN | 1477012 | 2/2004 |
|---|---|---|
| CN | 1519149 | 8/2004 |

(Continued)

OTHER PUBLICATIONS

International Search Report for PCT/EP2011/054414, dated Mar. 23, 2011.
European Patent Office, International Preliminary Report on Patentability, Sep. 25, 2012, from International Patent Application No. PCT/EP2011/054414, filed on Mar. 23, 2011.

*Primary Examiner* — Todd Melton
(74) *Attorney, Agent, or Firm* — Kenyon & Kenyon LLP

(57) ABSTRACT

A method, and related device, for operating a brake device of a vehicle with brake slip regulation (ABS) on roadways with different friction coefficients on different sides, as a result of which a braking yaw moment is imparted to the vehicle during braking, characterized in that, on at least one axle of the vehicle, an absolute brake pressure difference between the brake pressure at the wheel with the higher friction coefficient and the brake pressure at the wheel with the lower friction coefficient is adapted as a function of a steer input, intended to produce a yaw moment acting counter to the braking yaw moment, by the driver and/or by an automatically intervening auxiliary steering system.

17 Claims, 1 Drawing Sheet

(56) References Cited

U.S. PATENT DOCUMENTS

| | | | |
|---|---|---|---|
| 7,302,328 B2 * | 11/2007 | Kato et al. | 701/41 |
| 7,331,642 B2 * | 2/2008 | Miller | 303/148 |
| 7,374,014 B2 * | 5/2008 | Yasui et al. | 180/446 |
| 7,661,772 B2 * | 2/2010 | Heinemann | 303/146 |
| 7,775,608 B2 * | 8/2010 | Schmidt et al. | 303/148 |
| 8,068,967 B2 * | 11/2011 | Schutz et al. | 701/73 |
| 2002/0030407 A1 | 3/2002 | Nishizaki et al. | |
| 2002/0198646 A1 | 12/2002 | Bedner et al. | |
| 2006/0100766 A1 | 5/2006 | Schwarz et al. | |
| 2007/0001510 A1 | 1/2007 | Miller | |

FOREIGN PATENT DOCUMENTS

| | | |
|---|---|---|
| CN | 1765669 | 5/2006 |
| DE | 602 17 834 | 8/2007 |
| EP | 1 388 472 | 2/2004 |
| EP | 1 522 484 | 4/2005 |
| WO | 2004/005093 | 1/2004 |

* cited by examiner

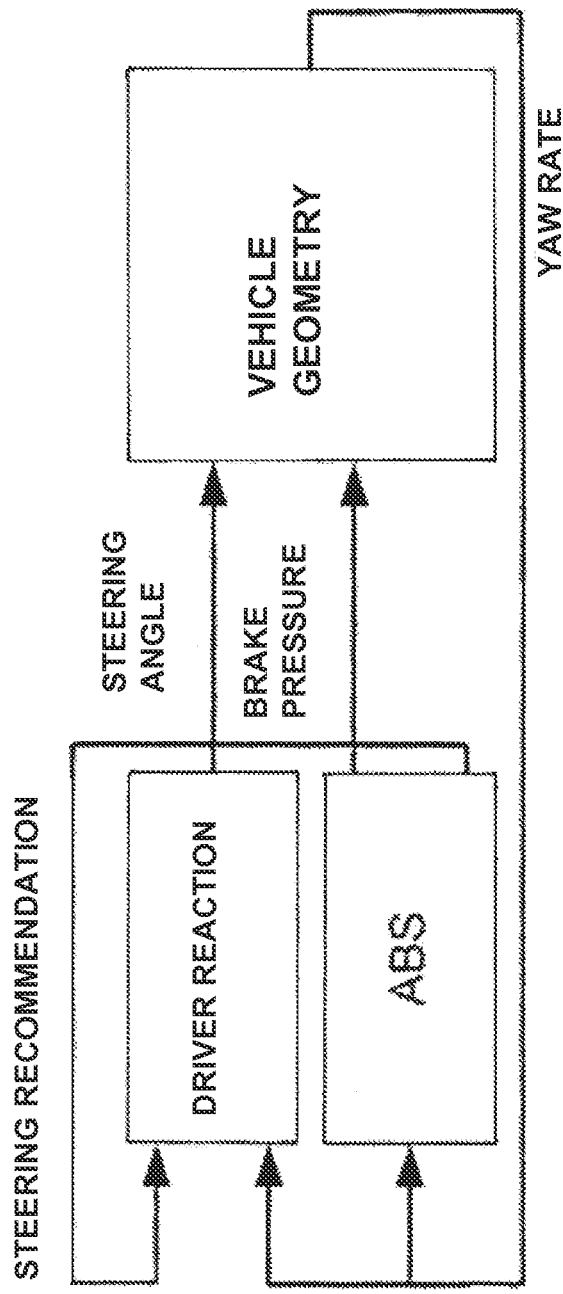

METHOD FOR OPERATING A BRAKE DEVICE OF A VEHICLE WITH A BRAKE PRESSURE DIFFERENCE ON AN AXLE ADAPTED AS A FUNCTION OF A STEER INPUT

FIELD OF THE INVENTION

A method for operating a brake device of a vehicle with an antilock control system on roadways with different friction coefficients on different sides, as a result of which a braking yaw moment is imparted to the vehicle during braking.

BACKGROUND INFORMATION

In order to avoid a situation where the wheels of the motor vehicle lock up when the brake is actuated due to an excessive brake pressure applied by the vehicle driver and, as a result, the motor vehicle loses its stability or steerability, vehicle brake systems are usually fitted with a brake slip regulation system (ABS), in which the brake slip is adjusted to an optimum brake slip.

In the case of brake slip regulation, the brake pressure is in each case automatically modulated, i.e. lowered, held constant and raised again, independently of the brake pedal force applied by the vehicle driver, at least in part of the pressure-medium-actuated brake system, if a risk of one or more vehicle wheels locking up is detected, until there is no longer a risk of locking up. In very general terms, therefore, brake slip regulating devices for motor vehicle brake systems have the task of ensuring directional stability and steerability of the vehicle combined with the shortest possible stopping and braking distances, especially when the roadway is slippery and the service brake system is fully applied.

On roadways with friction coefficients that are significantly different as between the right and the left (split coefficient), however, there may be a reduction in the directional or driving stability of the vehicle owing to the very large difference in the effective braking forces which then occurs at the right-hand and left-hand vehicle wheels. This severe asymmetry or lack of balance in the effective braking forces on the right-hand and left-hand side of the vehicle produces a braking yaw moment of greater or lesser magnitude in accordance with these asymmetrical forces, rotating the vehicle about the vertical axis thereof. In order to counteract this and to maintain directional or driving stability, i.e. to keep the vehicle on course, the vehicle driver can actuate the steering wheel by way of correction in order to produce a yaw moment acting counter to the braking yaw moment.

In the case of vehicle brake systems with protection against locking up, there is therefore generally a conflict of aims in such situations. On the one hand, the aim is to achieve braking and stopping distances which are as short as possible when braking but, on the other hand, it is also important to maintain directional or driving stability and steerability of the vehicle when braking.

In this context, manufacturers of brake-slip-regulated motor vehicle brake systems generally give higher priority to maintaining directional or driving stability and steerability of the vehicle than to achieving the shortest possible braking distances.

In order to maintain the directional and driving stability of the vehicle, the ABS control strategy is adapted in such driving situations. In this case, at least the wheels on one axle are subject to antilock control on the "select-low" principle, for example, i.e. they are controlled in dependence on the vehicle wheel currently operating with the lowest friction coefficient. This means that, in the operating situation described above, the brake of the wheel rotating on the higher friction coefficient is supplied only with the same, comparatively low brake pressure as the brake of the other wheel, that rotating on the lower friction coefficient, even though it could in fact be braked more strongly without locking up because of the higher friction coefficient prevailing at this wheel. In this case, therefore, braking forces of the same high magnitude or the same low magnitude are applied to both wheels, the result being that they do not contribute anything to the production of a braking yaw moment. Since the wheel rotating on the higher friction coefficient is braked less strongly than is possible, it has a correspondingly high potential to carry lateral forces, and this benefits the directional or driving stability of the vehicle. However, the good directional and driving stability is obtained at the expense of longer braking distances since, with this control principle, the vehicle wheels rotating on higher friction coefficients are braked less strongly than would be permitted per se by the adhesion prevailing there.

Inasmuch as the two front wheel brakes in a hydraulic vehicle antilock brake system with rear wheels protected from locking up by the select-low principle are protected individually from locking up by dedicated devices, it is customary to attenuate the effect of any yaw moment that builds up due to braking forces of different magnitude at the right-hand and left-hand front wheel by "yaw moment modification" superimposed on the individual antilock control for the two front wheels. The superimposed yaw moment modification ensures that the brake pressure at the front wheel rotating on the higher friction coefficient is built up more slowly than is possible per se in order to give the vehicle driver additional time to respond, i.e. to countersteer, by the resulting delayed buildup in the yaw moment. The superimposed yaw moment modification also contributes to a deterioration in the achievable braking or stopping distance.

According to DE 602 17 834 T2, there is an electrically assisted steering system which intervenes during a split-coefficient braking operation under brake slip regulation in order to keep the vehicle stable by automatic steer inputs. By these stabilization measures, the ABS behavior can be made more aggressive, with the brake pressure at the wheel with the higher friction coefficient being increased more quickly, i.e. at a higher rate, until the slip threshold is reached.

DISCLOSURE OF THE INVENTION

It is accordingly an object of the exemplary embodiments and/or exemplary methods of the present invention to develop a method of the type mentioned at the outset in such a way that, during a split-coefficient braking operation under brake slip regulation, the braking effect is as high as possible, on the one hand, but that, on the other hand, driving stability is also as high as possible.

According to the exemplary embodiments and/or exemplary methods of the present invention, this object is achieved by the features described herein.

The exemplary embodiments and/or exemplary methods of the present invention is intended to provide that, on at least one axle of the vehicle, an absolute brake pressure difference between the brake pressure at the wheel with the higher friction coefficient and the brake pressure at the wheel with the lower friction coefficient is adapted as a function of a steer input, intended to produce a yaw moment acting counter to the braking yaw moment, by the driver and/or by an automatically intervening auxiliary steering system.

In an exemplary embodiment, the brake pressure difference permitted is larger, the larger the counter yaw moment produced by the steer input or the larger the actual yaw rate resulting therefrom, and the brake pressure difference permitted is smaller, the smaller the counter yaw moment produced by the steer input or the smaller the actual yaw rate resulting therefrom.

In other words, the permissible brake pressure difference at the axle may be adapted continuously or in an infinitely variable manner to the steer input by the driver and/or by the auxiliary steering system as a response to the braking yaw moment produced during the split-coefficient braking operation. Thus, the more the driver or the auxiliary steering system counteracts the braking yaw moment by a steer input, the larger is the brake pressure difference that can be permitted between the wheels on different sides by the ABS controller. In this case, a larger absolute brake pressure difference then means, for example, that the wheel on the side with the higher friction coefficient is braked with a higher braking force, leading ultimately to a greater overall braking effect.

In contrast, e.g., according to DE 602 17 834 T2, only the brake pressure gradient is modified as the stability increases by virtue of a steer input by the auxiliary steering system, i.e. a more rapid brake pressure buildup is permitted at the wheel with the higher friction coefficient, but there is no modification of the absolute value of the brake pressure difference between the wheel on the side with the higher friction coefficient and the wheel on the side with the lower friction coefficient.

Overall, therefore, higher braking forces can be produced by the exemplary embodiments and/or exemplary methods of the present invention in the case of braking operations under split-coefficient conditions if the driver and/or an auxiliary steering system make stabilizing interventions.

Here, the stabilizing steer input is performed by the driver or automatically by an auxiliary steering system. The auxiliary steering system can assist the driver by specifying a steering recommendation, e.g. by a steering torque that can be felt by the driver at the steering wheel. The control unit of the auxiliary steering system obtains information on the presence of a braking yaw moment in the case of a braking operation under split-coefficient conditions from a yaw rate sensor, for example. A steer input by the driver can be detected by a steering angle sensor, for example. Both variables—steering angle and yaw rate—therefore allow an inference as to the currently available level of stability of the vehicle (yaw rate) and as to the input that has been made by the driver or the auxiliary steering system (steering angle) in the case of a braking operation under split-coefficient conditions. In this situation, the two variables influence each other. Thus, a "correct" steer input as a response to the braking yaw moment can leads to a reduction in the actual yaw rate of the vehicle. Otherwise, a high actual yaw rate as a consequence of a high braking yaw moment can require a larger steer input. Moreover, it is, of course, possible for "incorrect" steer inputs as a response to the braking yaw moment to lead to an increase in the actual yaw rate.

Advantageous developments and improvements of the exemplary embodiments and/or exemplary methods of the present invention indicated in the description herein are possible by the measures presented in the further descriptions herein.

In a particular embodiment, the actual yaw rate of the vehicle is adjusted by closed-loop control to a setpoint yaw rate as a function of the steer input by the driver and/or by the auxiliary steering system by modifying the brake pressure difference or the differential brake pressure value. In this case, the yaw rate represents a controlled variable, the steer input represents a disturbance and the brake pressure difference represents a manipulated variable of the closed-loop control system. By this closed-loop control, the stability of the vehicle is given priority, and the brake pressure difference at the axle is adapted on an ongoing or continuous basis so as to minimize the system deviation.

For carrying out the method, the exemplary embodiments and/or exemplary methods of the present invention provides a device which comprises at least one brake actuator per wheel of the axle, said brake actuator being controllable electrically, directly or indirectly, and being actuated by pressure medium, at least one brake pressure sensor per brake actuator for the purpose of producing sensor signals dependent on the brake pressure acting in the respective brake actuator, at least one steering angle sensor for producing sensor signals dependent on the steer input, at least one yaw rate sensor for producing sensor signals dependent on the yaw rate of the vehicle or on yaw rates acting on the vehicle, and at least one electronic control unit, which adapts the brake pressure difference or differential brake pressure value between the brake pressure at the wheel with the higher friction coefficient and the brake pressure at the wheel with the lower friction coefficient as a function of the sensor signals produced by the steering angle sensor, the yaw rate sensor and the brake pressure sensors. These components are present in any case as part of vehicle dynamics control systems (ESP), and therefore no additional outlay on construction is required for the device.

An auxiliary steering system controlled by the control unit in such a way that a yaw moment acting counter to the braking yaw moment is produced at the steering wheel, eliminating the difference between the actual yaw rate and the setpoint yaw rate, may also be provided.

Further measures that improve the exemplary embodiments and/or exemplary methods of the present invention are explained in greater detail below with reference to the drawing, together with the description of an illustrative embodiment of the present invention.

BRIEF DESCRIPTION OF THE DRAWINGS

The FIGURE shows a block diagram which illustrates the method in accordance with an exemplary embodiment of the present invention.

DETAILED DESCRIPTION

The block diagram in the FIGURE illustrates an exemplary embodiment of a method for operating a brake device, e.g. an electropneumatic brake device, or an electronic brake system (EBS) of a commercial vehicle with an antilock brake system (ABS) on roadways with different friction coefficients on different sides. Owing to the difference in the friction coefficients on different sides, a braking yaw moment on the vehicle is produced during braking, resulting in an actual yaw rate, "yaw rate", that can be measured by a yaw rate sensor.

On, for example, a front axle of the commercial vehicle, an absolute brake pressure difference or absolute differential brake pressure value between the brake pressure value at the wheel on the end of the axle with the higher friction coefficient and the brake pressure value at the wheel on the end of the axle with the lower friction coefficient is adapted as a function of a steer input, intended to produce a yaw moment acting counter to the braking yaw moment, by the driver and by an automatically intervening auxiliary steering system.

As a particular option, the actual yaw rate, "yaw rate", of the vehicle is adjusted by closed-loop control to a setpoint yaw rate as a function of the steer input by the driver and by the auxiliary steering system by modifying the differential brake pressure value to a setpoint yaw rate. In this case, the yaw rate represents the controlled variable, the steer input represents the disturbance and the brake pressure difference represents a manipulated variable of the control system. The block labeled "vehicle geometry" in the FIGURE symbolizes the controlled system.

To achieve control, there is one brake actuator per wheel of the front axle, said brake actuator being controllable electrically, directly or indirectly, and being actuated by pressure medium, one brake pressure sensor per brake actuator for the purpose of producing sensor signals dependent on the brake pressure acting in the respective brake actuator, a steering angle sensor for producing sensor signals dependent on the steer input, a yaw rate sensor for producing sensor signals dependent on the yaw rate of the vehicle or on yaw rates acting on the vehicle, and an ABS control unit, which is denoted by "ABS" in the FIGURE and forms the controller.

The ABS control unit, "ABS", adapts the brake pressure difference, "brake pressure", between the brake pressure at the wheel with the higher friction coefficient and the brake pressure at the wheel with the lower friction coefficient as a function of the sensor signals produced by the steering angle sensor, the yaw rate sensor and the brake pressure sensors.

There may be also an auxiliary steering system which is controlled by the ABS control unit, "ABS", and, for compensation, produces a yaw moment at the steering wheel acting counter to the braking yaw moment, which is also denoted in the FIGURE as "steering recommendation". This "steering recommendation" is intended to eliminate the difference between the actual yaw rate ("yaw rate") and the setpoint yaw rate. In addition, the driver can furthermore also perform stabilizing steer inputs, this being denoted by "driver response" in the FIGURE.

During a braking operation under split-coefficient conditions, a braking yaw moment consequently arises, this being detected by the yaw rate sensor and being reported to the ABS control unit, "ABS", by a corresponding signal, "yaw rate". The control unit compares the actual yaw rate, "yaw rate", with a setpoint yaw rate, which is equal to zero in straight ahead travel, for example. At the same time, the ABS control unit, "ABS", controls the auxiliary steering system in order to produce an opposing yaw moment to compensate for the braking yaw moment. This yaw moment can also be felt by the driver at the steering wheel, and the driver can either leave the yaw moment specified by the auxiliary steering system unchanged without intervening or can modify it by intervening ("driver response"). The block labeled "vehicle" or "vehicle geometry" then receives a "steering angle" specified by the steer input by the driver and/or by the auxiliary steering system ("steering recommendation") and a "brake pressure" (brake pressure difference) as input variables, which lead to a particular actual yaw rate, "yaw rate", along the controlled system, "vehicle geometry".

Thus, a "correct" steer input as a response to the braking yaw moment can leads to a reduction in the actual yaw rate, "yaw rate" of the vehicle. As the yaw rate decreases, the permissible brake pressure difference, "brake pressure", is simultaneously increased in order to enable more braking power to be transmitted, with the associated increase in driving stability.

It is clear here, however, that a high actual yaw rate as a consequence of a high braking yaw moment requires a larger compensating steer input or steering angle.

Otherwise, that is to say when there is an "incorrect" steer input in the presence of a braking yaw moment, e.g. when the driver overrides the "steering recommendation" of the auxiliary steering system by a manual steer input, the actual yaw rate, "yaw rate", will increase undesirably, thus further reducing driving stability. To the extent that instability is increased by an increase in the actual yaw rate, "yaw rate", however, the permissible differential brake pressure value, "brake pressure", is reduced in order to avoid further increasing the instability or to reduce the braking yaw moment through a reduced asymmetry of the braking forces.

According to another embodiment, there is no auxiliary steering system. In this case, it is the driver's responsibility alone to compensate for the braking yaw moment through his steer inputs.

The invention claimed is:

1. A method for operating a brake device of a vehicle with brake slip regulation (ABS) on roadways with different friction coefficients on different sides, as a result of which a braking yaw moment is imparted to the vehicle during braking, the method comprising:
   adapting, on at least one axle of the vehicle, an absolute brake pressure difference between the brake pressure at the wheel with the higher friction coefficient and the brake pressure at the wheel with the lower friction coefficient as a function of a steer input, to produce a yaw moment acting counter to the braking yaw moment, which is caused by at least one of the driver and an automatically intervening auxiliary steering system;
   wherein there is a modification of an absolute value of the absolute brake pressure difference between the wheel with the higher friction coefficient and the wheel with the lower friction coefficient,
   wherein the modification occurs as a function of a steering input, intended to produce a yaw moment acting counter to a braking yaw moment, by at least one of a driver and an automatically intervening auxiliary steering system,
   wherein the actual yaw rate of the vehicle is adjusted by closed-loop control to a setpoint yaw rate as a function of the steering input by the at least one of the driver and the auxiliary steering system by modifying the absolute value of the brake pressure difference or the differential brake pressure value, wherein the brake pressure difference represents a manipulated variable of the closed-loop control system, so that by the closed-loop control, stability of the vehicle is given priority, and the absolute value of the brake pressure difference at the axle is adapted on a continuous basis so as to minimize a system deviation, and
   wherein there is an incorrect steering input in the presence of a braking yaw moment, so that the actual yaw rate increases so as to reduce driving stability, the differential brake pressure value is reduced to avoid further increasing the instability or to reduce the braking yaw moment through a reduced asymmetry of the braking forces.

2. The method of claim 1, wherein the brake pressure difference permitted is larger, the larger the counter yaw moment produced by the steer input, and in that the brake pressure difference permitted is smaller, the smaller the counter yaw moment produced by the steer input.

3. The method of claim 2, wherein the adaptation of the brake pressure difference is performed exclusively as a function of the steer input by the driver.

4. The method of claim 2, wherein the adaptation of the brake pressure difference is performed continuously as a function of the steer input.

5. The method of claim 2, wherein the adaptation of the brake pressure difference is performed on a front axle brake device.

6. The method of claim 2, wherein the actual yaw rate of the vehicle is adjusted to a setpoint yaw rate as a function of the steer input by modifying the brake pressure difference.

7. The method of claim 6, wherein the setpoint yaw rate is substantially equal to zero.

8. The method of claim 1, wherein the yaw rate represents a controlled variable and the steering input represents a disturbance.

9. A device for operating a brake device of a vehicle with brake slip regulation (ABS) on roadways with different friction coefficients on different sides, as a result of which a braking yaw moment is imparted to the vehicle during braking, comprising:
- at least one brake actuator per wheel of the axle, the brake actuator being controllable electrically, directly or indirectly, and being actuated by pressure medium;
- at least one brake pressure sensor per brake actuator for producing sensor signals dependent on the brake pressure acting in the respective brake actuator;
- at least one steering angle sensor for producing sensor signals dependent on the steer input;
- at least one yaw rate sensor for producing sensor signals dependent on the yaw rate of the vehicle or on yaw rates acting on the vehicle; and
- an electronic control unit configured to adapt the brake pressure difference between the brake pressure at the wheel with the higher friction coefficient and the brake pressure at the wheel with the lower friction coefficient as a function of the sensor signals produced by the steering angle sensor, the yaw rate sensor and the brake pressure sensors;
- wherein there is a modification of an absolute value of the absolute brake pressure difference between the wheel with the higher friction coefficient and the wheel with the lower friction coefficient,
- wherein the modification occurs as a function of a steering input, intended to produce a yaw moment acting counter to a braking yaw moment, by at least one of a driver and an automatically intervening auxiliary steering system, and
- wherein the actual yaw rate of the vehicle is adjusted by closed-loop control to a setpoint yaw rate as a function of the steering input by the at least one of the driver and the auxiliary steering system by modifying the absolute value of the brake pressure difference or the differential brake pressure value, wherein the brake pressure difference represents a manipulated variable of the closed-loop control system, so that by the closed-loop control, stability of the vehicle is given priority, and the absolute value of the brake pressure difference at the axle is adapted on a continuous basis so as to minimize a system deviation, and
- wherein there is an incorrect steering input in the presence of a braking yaw moment, so that the actual yaw rate increases so as to reduce driving stability, the differential brake pressure value is reduced to avoid further increasing the instability or to reduce the braking yaw moment through a reduced asymmetry of the braking forces.

10. The device of claim 9, further comprising:
- an auxiliary steering system controlled by the control unit so that a yaw moment acting counter to the braking yaw moment is produced at the steering wheel, adjusting the difference between the actual yaw rate and the setpoint yaw rate to zero.

11. The device of claim 9, wherein the brake pressure difference permitted is larger, the larger the counter yaw moment produced by the steer input, and in that the brake pressure difference permitted is smaller, the smaller the counter yaw moment produced by the steer input.

12. The device of claim 9, wherein the adaptation of the brake pressure difference is performed exclusively as a function of the steer input by the driver.

13. The device of claim 9, wherein the adaptation of the brake pressure difference is performed continuously as a function of the steering input.

14. The device of claim 9, wherein the adaptation of the brake pressure difference is performed on a front axle brake device.

15. The device of claim 9, wherein the actual yaw rate of the vehicle is adjusted to a setpoint yaw rate as a function of the steer input by modifying the brake pressure difference.

16. The device of claim 15, wherein the setpoint yaw rate is substantially equal to zero.

17. The device of claim 9, wherein the yaw rate represents a controlled variable and the steering input represents a disturbance.

* * * * *